(12) United States Patent
Mohanty et al.

(10) Patent No.: US 8,031,649 B2
(45) Date of Patent: Oct. 4, 2011

(54) SYSTEMS AND METHODS FOR ARRANGING MAC LAYER PDUS IN A DOWNLINK BURST

(75) Inventors: Shantidev Mohanty, Hillsboro, OR (US); Jose Puthenkulam, Beaverton, OR (US); Shailender Timiri, Hillsboro, OR (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 11/675,973

(22) Filed: Feb. 16, 2007

(65) Prior Publication Data

US 2008/0198830 A1    Aug. 21, 2008

(51) Int. Cl.
*H04H 20/71* (2008.01)
(52) U.S. Cl. .................... 370/312; 370/432
(58) Field of Classification Search .............. 370/328, 370/334, 339, 345, 310, 310.2, 338, 395.3, 370/312, 329, 330, 390, 395.1, 431–437, 370/352–356, 393, 394, 514; 455/450, 451, 455/452.1, 455, 464
See application file for complete search history.

(56) References Cited

U.S. PATENT DOCUMENTS

| | | | |
|---|---|---|---|
| 7,266,087 B2* | 9/2007 | Wahl | 370/252 |
| 2004/0127244 A1* | 7/2004 | Matsumoto et al. | 455/517 |
| 2006/0193286 A1* | 8/2006 | Naghian et al. | 370/328 |
| 2006/0239264 A1* | 10/2006 | Kang et al. | 370/390 |
| 2007/0014237 A1* | 1/2007 | Nishibayashi et al. | 370/229 |
| 2007/0070905 A1* | 3/2007 | Oliver et al. | 370/235 |
| 2007/0097942 A1* | 5/2007 | Gorokhov et al. | 370/342 |

* cited by examiner

*Primary Examiner* — Kent Chang
*Assistant Examiner* — San Htun
(74) *Attorney, Agent, or Firm* — Schwegman, Lundberg & Woessner, P.A.

(57) ABSTRACT

Embodiments of systems and methods for arranging data units in a downlink burst transmission are generally described herein. Other embodiments may be described and claimed. In some embodiments a group of data units are arranged by associated identifiers. These identifiers may also be associated with certain subscriber stations. Once arranged, the data units may be transmitted in a downlink burst and received by a subscriber station. The subscriber station may determine the arrangement of the data units to decode until a cutoff value is determined and passed.

14 Claims, 3 Drawing Sheets

SYSTEMS AND METHODS FOR ARRANGING MAC LAYER PDUS IN A DOWNLINK BURST

TECHNICAL FIELD

The present inventive subject matter pertains to wireless communications. Some embodiments may pertain to the arrangement of medium access control protocol data units (MPDUs) in downlink bursts.

BACKGROUND

In wireless networks, one or more subscriber stations communicate through a base station. A subscriber station receives traffic from the base station in the downlink (DL) channel and sends traffic to the base station in the uplink (UL) channel. The DL channel is a broadcast channel because the transmissions by a base station can be received by all the subscriber stations that are in the base station's coverage area. Different parts of the DL transmission, however, may be destined only for specific subscriber stations, and not for others. In some cases the base station may inform the subscriber stations about the allocations in the DL frame before it transmits the traffic destined for specific subscriber stations in the DL channel. In this case, different subscriber stations may process only the portion of the DL channel that is intended for them. In other cases, the base station may not send out information regarding allocations in a DL frame. In this case, the subscriber station may process all portions of the DL frame in order to determine what if any portions are allocated to that subscriber station. This process may take up valuable time and processing power.

Thus, there are general needs for systems and methods for reducing processing time and power consumption by more efficiently handling DL transmissions, particularly when the base station does not send out information regarding allocations in the DL frame.

DETAILED DESCRIPTION

The following description and the drawings sufficiently illustrate specific embodiments of the inventive subject matter to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the inventive subject matter set forth in the claims encompass all available equivalents of those claims. Embodiments of the inventive subject matter may be referred to herein, individually or collectively, by the term "invention" merely for convenience and without intending to limit the scope of this application to any single invention or inventive concept if more than one is in fact disclosed.

Figure 1:
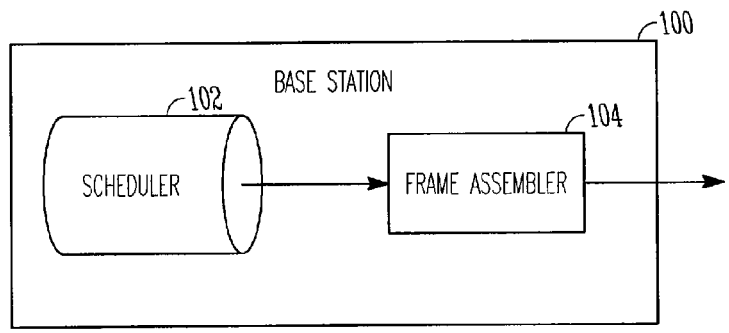
FIG. 1 is a block diagram of a base station accordance with various embodiments.

FIG. 1 is a block diagram of a base station accordance with various embodiments. The base station 100 comprises a scheduler 102 and a frame assembler 104.

When the base station 100 is preparing data for transmission, it may do so by preparing a transmission frame and populating the frame with transmission data. Included within the frame are various data units. These data units are grouped into downlink (DL) bursts within the frame. According to various embodiments, the scheduler 102 may schedule the data units for a particular DL burst. The scheduler 102 may organize which data units will be transmitted in which DL burst within a particular frame. The frame assembler 104 may then arrange the data units in a particular order for transmission. By arranging the data units in a particular order, a remote device such as a subscriber station that receives the transmission frame may be able to reduce its processing time and power consumption when decoding the contents of the frame. A logical arrangement of the data units in a DL burst allows the subscriber station to more efficiently decode and process specific data units which are intended for that subscriber station.

In FIG. 1, the arrangement of the data units using a scheduler 102 and a frame assembler 104 are shown, however, the inventive subject matter is applicable irrespective of the actual components used to implement the data unit arrangement at the base station 100.

Figure 2:
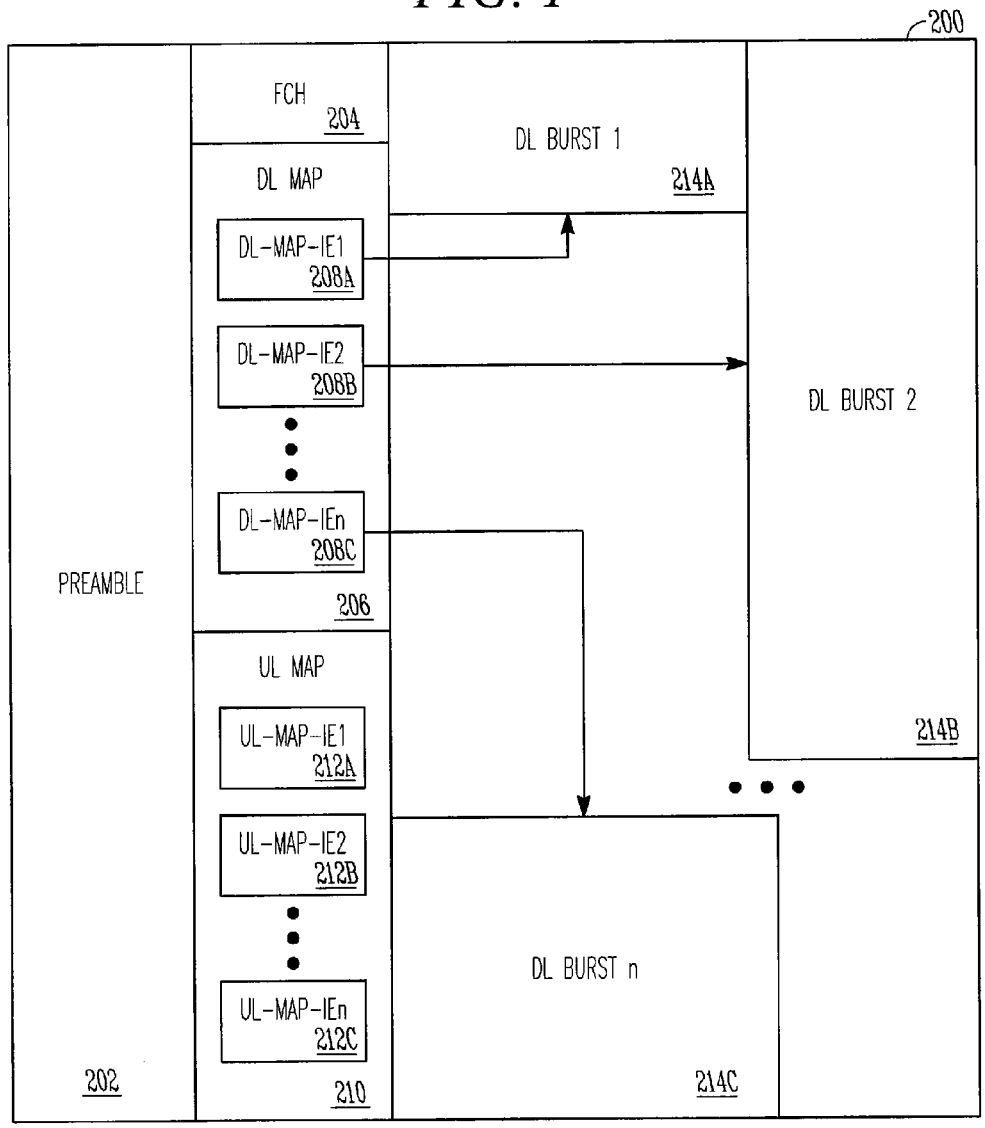
FIG. 2 illustrates a transmission frame in accordance with various embodiments.

FIG. 2 illustrates the downlink part of a transmission frame in accordance with various embodiments. The transmission frame 200 comprises a preamble 202, a frame control header (FCH) 204, a DL map 206 including several DL map information elements (DL-MAP-IEs) 208A-208C, an UL map 210 including several UL map information elements (UL-MAP-Es) 212A-212C, and a number of DL bursts 214A-214C.

According to an example embodiment, the transmission frame 200 may begin with the preamble 202, which may be used by subscriber stations to synchronize with a base station. The FCH 204 may follow the preamble, and contains information about the current frame such as the information about DL map 206 and UL map 210. Each DL burst 214A-214C in the transmission frame 200 may contain a number of data units as mentioned above. These data units may comprise, for example, medium access control protocol data units (MPDUs) according to various embodiments. Each MPDU may contain an identifier which is associated with a particular subscriber station. Sometimes the DL-MAP-IEs 208A-208C will contain data identifying the MPDUs in each DL burst 214A-214C by the identifier contained in each MPDU. That way when a subscriber station receives a transmission frame 200, it can read the DL-MAP-IEs 208A-208C in the DL map 206, and can refrain from decoding the DL bursts 214A-214C that do not contain MPDUs with identifiers associated with that subscriber station.

The DL map 206 and the DL-MAP-IEs 208A-208C do not always contain information about the MPDUs contained in the DL bursts 214A-214C. In these cases, a subscriber station would have to decode each MPDU in each DL burst 214A-214C for which a corresponding DL-MAP-IE 208A-208C does not contain MPDU information. The MPDUs in these DL bursts 214A-214C may each be decoded in order to determine which MPDUs have identifiers associated with that subscriber station. This process can be timely and power consuming.

In order to reduce processing time and power consumption, the MPDUs may be arranged within each DL burst 214A-214C such that a subscriber station can more efficiently process the transmission. The identifiers within each MPDU may provide a means for arranging the MPDUs according to various embodiments. In one example embodiment, the MPDUs in each DL burst 214A-214C are arranged in ascending order by their respective identifiers. This would allow a subscriber station to decode the MPDUs in a DL burst only until a particular maximum cutoff value is passed for the identifiers. Alternatively, the MPDUs may be arranged in descending order in each DL burst 214A-214C. In this situation the subscriber station would only need to decode the MPDUs in each burst until a particular minimum cutoff value is passed for the identifiers.

The DL bursts 214A-214C of transmission frame 200 are merely parts of a communication system. The actual definition of DL burst 214A-214C may vary from one communication standard to another. However, the concepts of the inventive subject matter are applicable irrespective of the actual definition of the DL burst 214A-214C or related terms. In general the concepts of the inventive subject matter are applicable as long as the MPDUs or data for different subscriber stations are located in a specific region of the transmission frame of a communication system. The DL bursts may simply be groups of MPDUs being transmitted within a transmission frame 200.

Figure 3:
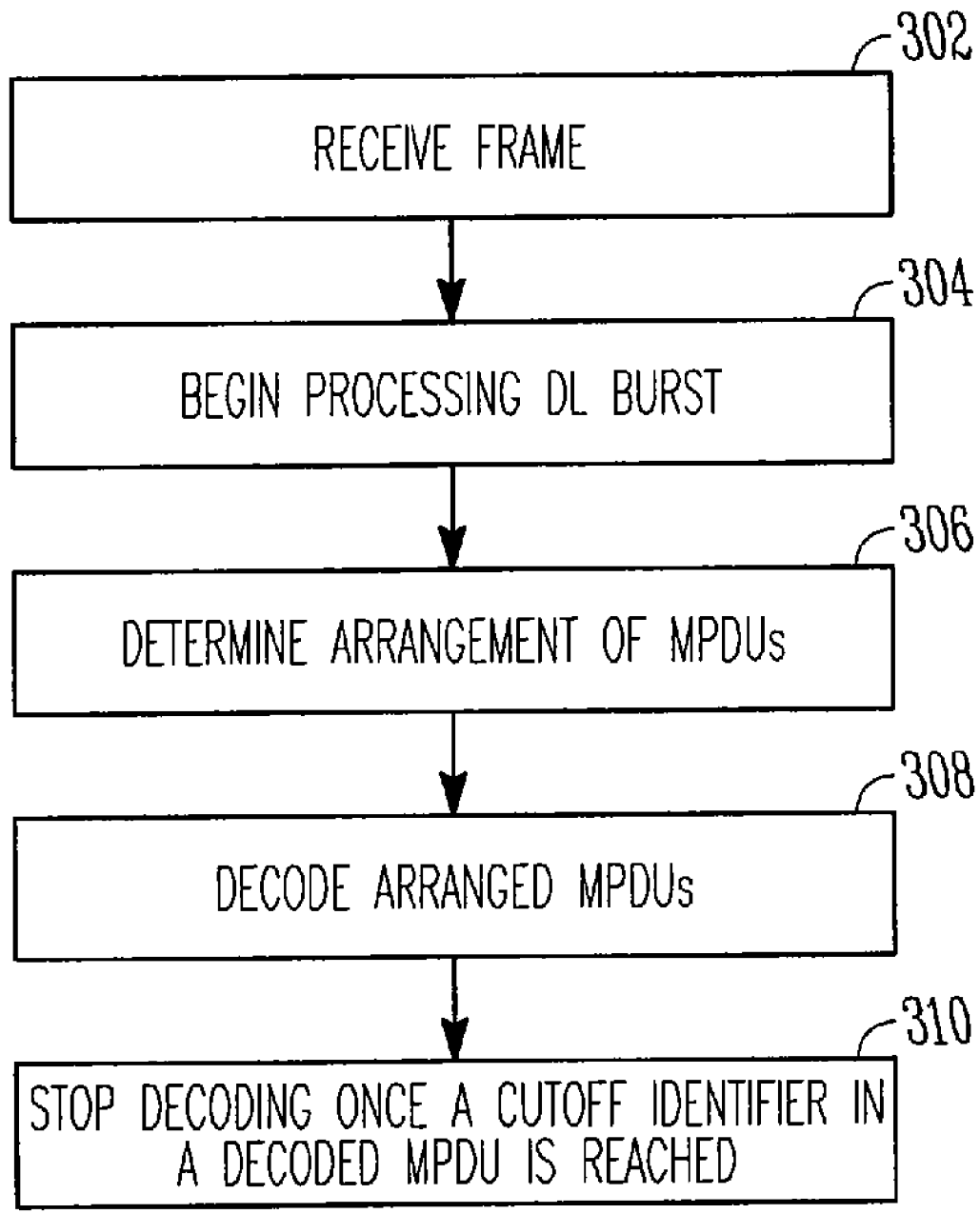
FIG. 3 is a flow diagram illustrating the processing of a transmission frame in accordance with various embodiments.

FIG. 3 is a flow diagram illustrating the processing of a transmission frame in accordance with various embodiments In FIG. 3, a transmission frame is received at a subscriber station (block 302), beginning to process a DL burst (block 304), determining the arrangement of the MPDUs in a DL burst (block 306), decoding the MPDUs (block 308), and refraining from decoding MPDUs after a certain cutoff point (block 310).

A subscriber station may receive transmission frames sent from a base station (block 302). Upon reception of a frame, the subscriber station may begin processing the DL bursts within the frame (block 304). The subscriber station may have one or more associated identifiers. When processing DL bursts, the subscriber station will be seeking MPDUs that contain those associated identifiers. When the transmission frame contains no data as to the distribution of MPDUs in various DL bursts, the subscriber station must either decode each MPDU in each DL burst or use a more efficient method of processing the DL bursts. The transmission frame may contain a flag informing subscriber stations whether the MPDUs in the DL bursts are arranged in any particular way. If this flag is set, the subscriber station may know that the MPDUs are arranged by their identifiers, but the subscriber station may not know the particular arrangement. There are multiple ways in which the subscriber station may determine the arrangement of the MPDUs in the DL bursts according to various embodiments of the inventive subject matter (block 306). A subscriber station may decode the first two or more MPDUs in a particular DL burst to obtain the associated identifiers. In some cases, the identifiers may be increasing in number or decreasing in number. This will tell the subscriber station if the MPDUs are arranged in ascending or descending order by their identifiers. Additionally, arrangement schemes may be set up where the MPDUs are arranged in a first order on even numbered transmission frames and in a second order on odd numbered transmission frames. The order or arrangement may be determined by the characteristics of the transmission frame.

Once the subscriber station determines that the MPDUs are arranged in a particular way, it may continue decoding the MPDUs (block 308) to find those to process that carry identifiers associated with the subscriber station. The subscriber station may have one or more identifiers associated with itself. Of those identifiers, one with a maximum value and one with a minimum value may exist. By determining its maximum and minimum valued identifiers, the subscriber station may set cutoff values to use when decoding MPDUs in DL bursts. These cutoff identifiers are not limited to the maximum and minimum valued identifiers associated with a subscriber station, but may be any identifier value used to act as a cutoff. If a DL burst has MPDUs arranged in ascending order by their identifiers, the subscriber station may decode the MPDUs until its maximum identifier value is surpassed (block 310). Conversely, if a DL burst has the MPDUs arranged in descending order by their identifiers, the subscriber station may decode the MPDUs until a lower valued identifier than its minimum identifier value is decoded (block 310).

It may be useful at times for a base station to vary or alternate the arrangement of the MPDUs in subsequent frames or DL bursts. When the MPDUs are arranged in increasing order of their identifiers, the subscriber stations having lower identifier values achieve significant reduction in their power consumption to decode the DL bursts. This is because their maximum identifier value is low, and they need to process fewer to surpass that value. Similarly, when the MPDUs are arranged in decreasing order of their identifiers, the subscriber stations having higher identifier values achieve significant reduction in their power consumption to decode the DL bursts.

Therefore, one way to reduce the power consumption evenly among the subscriber stations during the DL burst processing, irrespective of their identifier values, may be to have the base station use varying or alternating arrangements of MPDUs in different frames or DL bursts. In some frames or DL bursts the MPDUs may be arranged in increasing order of their identifier and in some other frames or DL bursts the MPDUs may be arranged in decreasing order of their identifiers. A system may be set up wherein a base station would transmit the MPDUs with a specific arrangement within a particular type of transmission frame. For example, a base station may transmit in increasing order on even numbered transmission frames, and in decreasing order on odd numbered transmission frames. The subscriber station may be able to determine the arrangement based solely on of the transmission frame number. This may allow for greater power and time savings for some subscriber stations during certain transmissions, and greater power and time savings for others during other transmissions. Overall, the power and time savings may average out across a group of subscriber stations.

Figure 4:
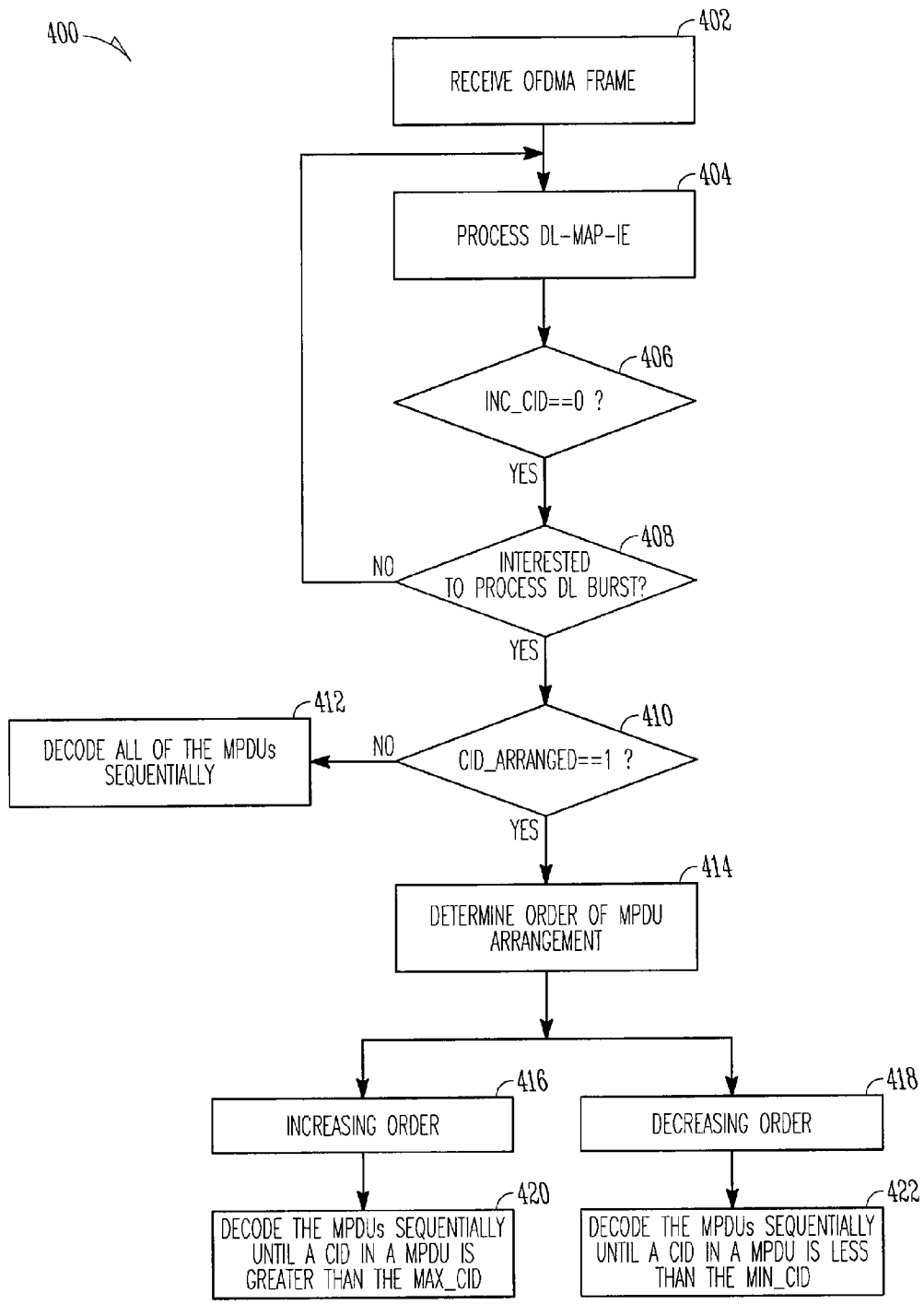
FIG. 4 is a more detailed flow diagram illustrating the processing of an Orthogonal Frequency Division Multiple Access (OFDMA) frame according to an example embodiment.

FIG. 4 is a more detailed flow diagram illustrating the processing of an OFDMA frame according to an example embodiment.

The downlink (DL) part of an OFDMA transmission frame may be broadcast from a base station as a wireless communication in a communication process 400. A remote subscriber station may receive the transmitted DL OFDMA frame (block 402) and begin processing. During the processing of the OFDMA frame, the subscriber station will process a particular DL-MAP-IE associated with a particular DL burst (block 404). The DL-MAP-IE may inform the subscriber station regarding the MPDUs in a DL burst. The MPDUs may contain identifiers that are associated with particular subscriber stations. These identifiers may be connection identifiers (CIDs). A CID is a 16 bit identifier that is contained within each MPDU and is used to identify a logical connection path in a communications system. Each subscriber station has one or more CIDs associated with it, and may determine which MPDUs to process based on the CID information. As a subscriber station is processing a DL-MAP-IE (block 404), it may read a field indicating whether or not the DL-MAP-IE contains the list of CIDs associated with MPDUs in a particular DL burst (Block 406). This field may be called INC_CID.

A base station may set the field INC_CID=1 if, for example, it is transferring only a small number of MPDUs in a particular DL burst (i.e., during the transmission of a movie or application or other large files). This way the DL-MAP-IE only needs to store a few CIDs, each of which is 16 bits in size. On the other hand, if a DL burst contains a large number of MPDUs (i.e., VOIP data, simple web pages, or other small files), the DL-MAP-IE would need to contain a large number of CIDs. At 16 bits per CID, a large number of CIDs may take significant amount of air link resources and take up additional power.

If INC_CID==0, indicating that the DL-MAP-IE does not contain the list of CIDs associated with MPDUs in a particular DL burst, then the subscriber station may determine if it wants to process the DL burst (block 408). If the DL burst is not to be processed, the subscriber station may move on to the next DL-MAP-IE (block 404). If the subscriber station is interested in the DL burst, then it will determine if a flag is set indicating that the MPDUs are arranged by their CIDs (block 410). The DL-MAP-IE may contain a flag that may be called CID_arranged for example. If this flag is set, and CID_arranged=1, then the subscriber station knows that the MPDUs in the DL burst associated with that DL-MAP-IE are arranged in some logical order. Alternatively, if CID_arranged=0, and the DL-MAP-IE indicates that the MPDUs are not arranged, then the subscriber station may decode each MPDU in the DL burst sequentially in an attempt to uncover MPDUs with CIDs which are also associated with the subscriber station (block 412).

If CID_arranged==1, and the subscriber station knows that the MPDUs are arranged, it may next determine the order of arrangement (block 414). As mentioned above, there are numerous ways for a subscriber station to determine the order and arrangement of the MPDUs in a DL burst according to various embodiments. Without any other information, a subscriber station may decode the first few MPDUs to determine the associated CIDs, and this information would reveal whether the MPDUs were arranged in increasing order (block 416) or decreasing order (block 418). If the MPDUs are arranged in increasing order by the associated CIDs (block 416), then the subscriber station would only need to decode the MPDUs in a DL burst until it has decoded one with a CID greater than the subscriber station's highest CID value (block 420). Conversely, if the MPDUs are arranged in decreasing order by the associated CIDs (block 418), then a subscriber station would only need to decode the MPDUs in a DL burst until it has decoded one with a CID lower than the subscriber station's lowest CID value (block 422). The particular cutoff identifiers associated with each subscriber station may be determined to facilitate this process. The subscriber station may thus determine its cutoff identifiers, the minimum (Min_CID) and maximum (Max_CID) associated CID values. For example, if a subscriber station has i number of CIDs $\{CID1, CID2, \ldots CIDi\text{-}1, CIDi\}$, then Max_CID=max $\{CID1, CID2, \ldots CIDi\text{-}1, CIDi\}$ and Min_CID=min$\{CID1, CID2, \ldots CIDi\text{-}1, CIDi\}$.

The CIDs are just one identifying value that may be used to arrange and organize MPDUs. Any other parameter used to indicate the intended receiver of DL data units may be applicable as well. Thus, the scope of the inventive subject matter is not limited by the actual parameter or identifier used to indicate the intended receiver of data units such as MPDUs.

Although the process of FIG. 4 specifies the use of an OFDMA based physical layer, the inventive subject matter is also applicable to a DL part of a transmission frame that employs other types of physical layers such as single carrier (SC) physical layer or Orthogonal Frequency Division Multiplexing (OFDM) physical layer, or other physical layers including those operating in accordance with the third generation (3G) or fourth generation (4G) communication standards, or the 3GPP, the 3GPP LTE, and/or the 3GPP2 Air Interface Evolution (AIE).

Although the communication system is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

In some embodiments, the communication process 400 may be implemented in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the inventive subject matter is not limited in this respect as the communication process 400 may also be suitable for transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, remote devices such as subscriber stations may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, a base station may operate using multiple-input multiple-output (MIMO) antenna systems, adaptive antenna systems (AAS), or diversity antennas. In additional embodiments, a base station may include a backhaul antenna or backhaul wired communication link.

Some embodiments may be implemented in one or a combination of hardware, firmware, and software. Embodiments of the inventive subject matter may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for transmitting data comprising:
   obtaining a plurality of data units associated with identifiers, the identifiers including connection identifiers (CIDs) associated with one or more subscriber stations, each identifier associated with a particular subscriber station;
   arranging a first group of data units in ascending order by their associated identifiers; arranging a second group of data units in descending order by their associated identifiers; and
   transmitting the first group of the data units in a downlink burst to the one or more subscriber stations;
   transmitting the second group of the data units in a second downlink burst to the one or more subscriber stations;
   wherein both the first and second downlink bursts include a bit flag configured to indicate that data units of the first and second group of data units are arranged in a logical order according to the identifiers;
   wherein the logical order of the first group of data units allows a subscriber station to determine a first cutoff value for the first data units based on a highest value identifier associated with the subscriber station, and to determine a second cutoff value for the second data units based on a lowest value identifier associated with the subscriber station, the first and second cutoff values allowing the subscriber station to refrain from decoding data units when no more of the first group of data units are intended for the subscriber station.

2. The method of claim 1, wherein the first group of data units is is transmitted before the second group of data units.

3. The method of claim 1, wherein the first group of data units is transmitted after the second group of data units.

4. The method of claim 1, wherein the plurality of data units are medium access control protocol data units (MPDUs).

5. The method of claim 1, wherein the downlink burst is a part of an orthogonal frequency division multiple access (OFDMA) transmission frame.

6. The method of claim 1, wherein the arranging of the first group of data units is transmitted in an even or odd numbered transmission frame, and the second group is transmitted in an even numbered transmission frame if the first group of data units is transmitted in an odd numbered transmission frame, otherwise the second group is transmitted in an odd numbered transmission frame.

7. A base station comprising:
   a frame assembler operable to assemble a first and a second frame for transmission, the frames each including a plurality of data units, the data units each being associated with identifiers, the identifiers including connection identifiers (CIDs) being associated with one or more remote devices, each identifier associated with a particular one of the remote devices;
   wherein the frame assembler is operable to arrange data units in a logical order by their associated identifiers and into groups within one or more downlink bursts within the frame, the frame assembler to configure a bit flag within the frame to indicate that data units are arranged in the logical order according to the identifiers, wherein the data units of the first frame are organized in ascending order by their connection identifiers, and the data units of the second frame are organized in descending order by their connection identifiers, wherein the logical order of the data units allows a subscriber station to determine a first cutoff value for the first frame based on a highest value identifier associated with the subscriber station, and a second cutoff value for the second frame based on a lowest value identifier associated with the subscriber station, wherein the first and second cutoff values allow the subscriber station to determine when none of the remaining data units in a group are intended for the subscriber station and to refrain from decoding the remaining units; and
   a transmitter to transmit the first and second frames.

8. The base station of claim 7, wherein the first frame is transmitted before the second frame.

9. The base station of claim 7, wherein the second frame is transmitted before the first frame.

10. The base station of claim 7, further comprising an adaptive antenna system.

11. A method for receiving data at a subscriber station comprising:
    determining an arrangement of data units received in a downlink burst based on a bit flag in the downlink burst, the downlink burst organized in a logical order according to connection identifiers associated with each of the data units, each connection identifier related to a particular subscriber station of a plurality of subscriber stations;
    wherein first data units are arranged in ascending order by the identifiers associated with each data unit in a first frame, and wherein second data units are arranged in descending order by the identifiers associated with each data unit in a second frame;
    determining, at the subscriber station, a first and a second cutoff identifiers associated with the subscriber station based on one or more connection identifiers within the downlink burst, each cutoff identifier representing a limiting value, the first cutoff value determined for the first frame based on a highest value identifier associated with the subscriber station, and the second cutoff value for the second frame based on a lowest value identifier associated with the subscriber station;
    decoding data units in the group of data units in an order corresponding to the arrangement of data units until a data unit with an associated identifier past the limiting value is decoded; and
    refraining from further decoding additional data units past the limiting value.

12. The method of claim 11, wherein first frame is received before the second frame.

13. The method of claim 11, wherein second frame is received before the first frame.

14. A non-transitory computer readable medium having instructions for causing a computer to execute the method of claim 11.

* * * * *